(12) United States Patent
Gurvich et al.

(10) Patent No.: US 10,781,839 B2
(45) Date of Patent: Sep. 22, 2020

(54) HYBRID METALLIC/COMPOSITE JOINT WITH ENHANCED STRENGTH

(71) Applicant: Goodrich Corporation, Charlotte, NC (US)

(72) Inventors: Mark R Gurvich, Middletown, CT (US); Rony Giovanni Ganis, Oakville (CA); Virginia H Faustino, Coventry, CT (US)

(73) Assignee: Goodrich Corporation, Charlotte, NC (US)

( * ) Notice: Subject to any disclaimer, the term of this patent is extended or adjusted under 35 U.S.C. 154(b) by 834 days.

(21) Appl. No.: 15/286,062

(22) Filed: Oct. 5, 2016

(65) Prior Publication Data

US 2018/0094663 A1   Apr. 5, 2018

(51) Int. Cl.
  *F16B 7/00* (2006.01)
  *F16B 11/00* (2006.01)
  *B64C 25/00* (2006.01)
  *F16C 7/02* (2006.01)

(52) U.S. Cl.
  CPC .......... *F16B 11/002* (2013.01); *B64C 25/00* (2013.01); *F16C 7/026* (2013.01); *F16C 2220/40* (2013.01)

(58) Field of Classification Search
  CPC .......... F16B 11/002; F16B 7/02; F16B 7/025; F16B 7/0413; F16B 7/042; F16C 2220/40; F16C 7/026; B64C 25/00; Y10T 403/49; Y10T 403/4908; Y10T 403/4949; Y10T 403/4966; B29C 66/534; B29C 66/5344
  See application file for complete search history.

(56) References Cited

U.S. PATENT DOCUMENTS 3,085,305 A  *  4/1963  Colombet ............. F16G 11/048
                                                    403/275
3,100,924 A  *  8/1963  Trier ....................... F16G 11/05
                                                    403/275

(Continued)

FOREIGN PATENT DOCUMENTS

DE     9308677 U1 * 10/1993 ........... E04B 1/5831
EP     2952795         12/2015
(Continued)

OTHER PUBLICATIONS

European Patent Office, European status Report dated Feb. 21, 2018 in Application No. 17194996.9-1013.

*Primary Examiner* — Matthew R McMahon
(74) *Attorney, Agent, or Firm* — Snell & Wilmer L.L.P.

(57) ABSTRACT

A metallic/composite joint may comprise a composite member extending along a centerline axis and a metallic member. The composite member may comprise a cylinder having a flared end. An outer surface of the flared end may be oriented at a first angle relative to the centerline axis. An inner surface of the metallic member may be oriented at a second angle relative to the centerline axis. The inner surface of the metallic member and the outer surface of the composite member may be separated by a first gap at a first location and may be separated by a second gap at a second location. In various embodiments, the composite member may comprise a cylinder having an angled end, an inner surface of the angled end oriented at the first angle and an insert having an outer surface oriented at the second angle.

6 Claims, 13 Drawing Sheets

(56) References Cited

U.S. PATENT DOCUMENTS

| | | | | | |
|---|---|---|---|---|---|
| 3,409,951 | A | * | 11/1968 | Morieras | F16G 11/04 24/122.6 |
| 3,778,185 | A | * | 12/1973 | Plowman | F02C 7/20 415/209.4 |
| 4,184,784 | A | * | 1/1980 | Killian | F16G 11/05 24/122.6 |
| 4,319,076 | A | * | 3/1982 | Piur | H01B 17/32 174/178 |
| 4,848,957 | A | * | 7/1989 | Umeda | B29C 70/86 403/374.4 |
| 5,415,490 | A | * | 5/1995 | Flory | F16G 11/05 24/122.6 |
| 5,984,369 | A | * | 11/1999 | Crook | F02K 9/343 285/21.1 |
| 7,770,265 | B2 | * | 8/2010 | Campbell | F16G 11/042 24/122.6 |
| 8,205,315 | B2 | * | 6/2012 | Mullen | F16C 7/026 280/93.511 |
| 8,763,450 | B2 | * | 7/2014 | Binder | G01M 9/08 244/131 |
| 9,388,927 | B2 | * | 7/2016 | Shmelev | F16L 33/2071 |
| 10,012,254 | B2 | * | 7/2018 | Ito | B29C 65/561 |
| 2004/0068227 | A1 | | 4/2004 | Baylis | |
| 2007/0007405 | A1 | * | 1/2007 | Al-Mayah | E04C 5/085 248/200 |
| 2017/0051767 | A1 | * | 2/2017 | Giannakopoulos | F15B 15/1447 |

FOREIGN PATENT DOCUMENTS

| | | |
|---|---|---|
| EP | 2998589 | 3/2016 |
| WO | 2008057405 | 5/2008 |

\* cited by examiner

HYBRID METALLIC/COMPOSITE JOINT WITH ENHANCED STRENGTH

FIELD

The present disclosure relates generally to metallic/composite joints and more specifically to metallic/composite joints having composite tubes.

BACKGROUND

Conventionally, various types of aircraft utilize actuators including, for example, to deploy nose, body, and/or wheel landing gear systems. Conventional actuator components are made of metallic materials and often comprise complex geometries and high strengths. However, these metallic components are typically heavy.

Substitution of metals by polymer-matrix composites (PMC) is one way to reduce weight of landing gears or aircraft actuators. Among significant challenges is implementation of strong joints for load transfer from composite elements to metallic parts. The composite elements are typically fabricated in the form of tubes and are capable of handling significant axial loads under both tension and compression.

SUMMARY

A metallic/composite joint may comprise a composite member comprising a cylinder having a flared end extending along a centerline axis, an outer surface of the flared end oriented at a first angle relative to the centerline axis, a metallic member perimetrically surrounding the outer surface of the flared end and having an inner surface oriented at a second angle relative to the centerline axis, wherein the inner surface of the metallic member and the outer surface of the composite member are separated by a first gap at a first location and are separated by a second gap at a second location, the first gap being greater than the second gap, the first location being axially spaced from the second location, and the first gap and the second gap being measured in a direction substantially orthogonal to the centerline axis.

In various embodiments, the composite member may comprise a fiber-reinforced polymer matrix composite. The first angle may be greater than the second angle. The first angle may vary along an axial direction. The second angle may vary along an axial direction. The first location may be located further axially inward from a terminus of the composite member at the flared end than the second location. The metallic/composite joint may further comprise an insert located at least partially within the flared end and having an outer surface oriented at a third angle relative to the centerline axis, wherein the first angle is substantially equal to the second angle and the third angle is greater than the first angle. The metallic/composite joint may further comprise an insert located at least partially within the flared end and having an outer surface oriented at a third angle relative to the centerline axis, wherein the third angle is substantially equal to the first angle. The metallic/composite joint may further comprise an insert located at least partially within the flared end and having an outer surface oriented at a third angle relative to the centerline axis, wherein the third angle is greater than the first angle.

A metallic/composite joint may comprise a composite member comprising a cylinder having an angled end extending along a centerline axis, an inner surface of the angled end oriented at a first angle relative to the centerline axis, an insert located at least partially within the angled end and having an outer surface oriented at a second angle relative to the centerline axis, wherein the outer surface of the insert and the inner surface of the composite member are separated by a first gap at a first location and are separated by a second gap at a second location, the first gap being greater than the second gap, the first location being axially spaced from the second location, and the first gap and the second gap being measured in a direction substantially orthogonal to the centerline axis.

In various embodiments, the composite member may comprise a fiber-reinforced polymer matrix composite. The first angle may be greater than the second angle. The first angle may vary along an axial direction. The second angle may vary along an axial direction. The first location may be located further axially inward from a terminus of the composite member at the angled end than the second location. The metallic/composite joint may further comprise a metallic member perimetrically surrounding the angled end and having an inner surface oriented at a third angle relative to the centerline axis, wherein the first angle is substantially equal to the second angle and the third angle is greater than the first angle. The metallic/composite joint may further comprise a metallic member perimetrically surrounding the angled end and having an inner surface oriented at a third angle relative to the centerline axis, wherein the third angle is substantially equal to the first angle. The metallic/composite joint may further comprise a metallic member perimetrically surrounding the angled end and having an inner surface oriented at a third angle relative to the centerline axis, wherein the third angle is greater than the first angle.

A method for reducing a maximum shear stress in a composite member of a metallic/composite joint may comprise positioning a metallic member to at least partially perimetrically surround a portion of a flared end of the composite member such that an inner surface of the metallic member and an outer surface of the flared end are separated by a first gap at a first location and are separated by a second gap at a second location, the first gap being greater than the second gap, the first location being axially spaced from the second location, and the first gap and the second gap being measured in a direction substantially orthogonal to a centerline axis of the composite member.

In various embodiments, the method may further comprise positioning an insert at least partially into the flared end of the composite member, and compressing the composite member between the metallic member and the insert.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes metallic/composite joints having composite cylindrical elements with cavities in the axial direction, such as tubes, or without cavities, such as a solid cylindrical element. Such joints may be used in aircraft systems, such as, for example, landing gear systems. However, the systems and methods of the present disclosure may be suitable for use in non-aircraft systems as well.

Substitution of metals by polymer-matrix composites (PMC) is one way to reduce weight of landing gears or aircraft actuators. Among significant challenges is implementation of strong joints for load transfer from composite elements to metallic parts. The composite elements are typically fabricated in the form of tubes and are capable of handling significant axial loads under both tension and compression. Significant stress concentrations may be generated in areas of the joint in response to axial loading of the composite tube. Similar stress concentrations are also expected in cases of axial compression. These stress concentrations indicate the most loaded locations in the composite element and, therefore, may be main factors affecting limits of their structural performance, i.e., their strength. Reduction of these stress concentrations to improve strength of the composite element is the objective of this invention, in accordance with various embodiments.

Figure 1:
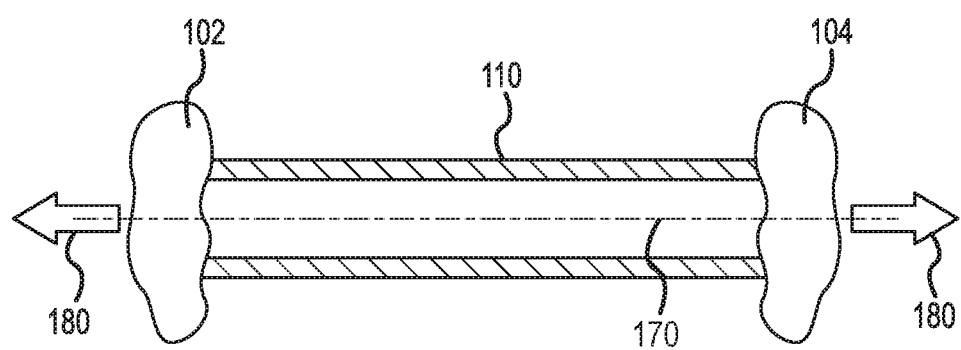
FIG. 1 illustrates a composite member having joints for transferring axial loads, in accordance with various embodiments.

With reference to FIG. 1, a composite member 110 is illustrated having a first joint 102 and a second joint 104. An axial load is illustrated by arrows 180. In various embodiments, said axial load may comprise either tension or compression. Composite member 110 may extend along centerline axis 170. Composite member 110 may comprise a solid cylinder. Composite member 110 may comprise a tube. It should be appreciated that composite members comprising cylindrical and/or tubular geometries exhibit significant tensile and compressive strength (i.e., mechanical loads along centerline axis 170). In various embodiments, the weight, strength, and stiffness of composite tubes may be dictated by fiber strength, fiber stiffness, fiber direction/placement, and resin system used. In contrast, metal tubing properties are generally only dictated by the material type and dimension of the tubing itself.

Figure 2A:
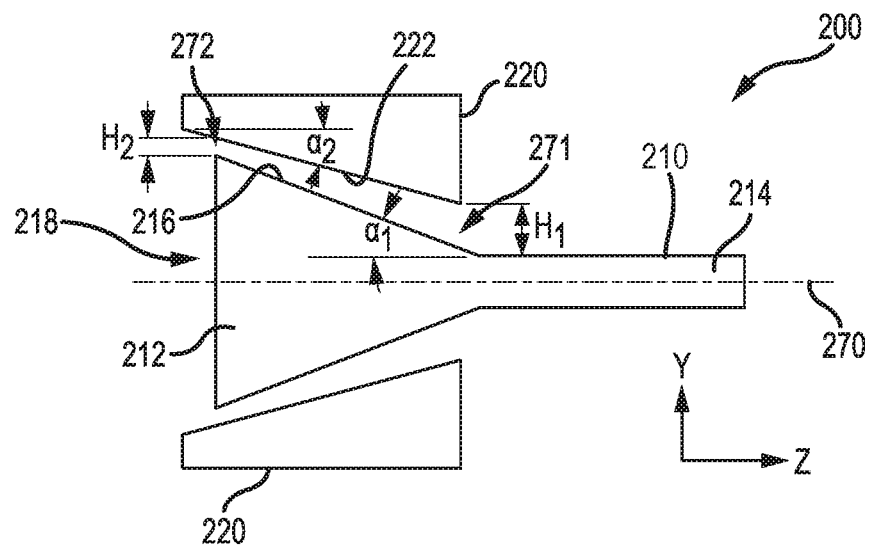
FIG. 2A illustrates an axial cross-section view of a metallic/composite joint, in accordance with various embodiments.

With reference to FIG. 2A, a cross section view of a metallic/composite joint 200 is illustrated, in accordance with various embodiments. Metallic/composite joint 200 may comprise a metallic member 220 and a composite member 210. Composite member 210 may comprise, for example, a lightweight fiber-reinforced polymer matrix composite such as a carbon fiber composite material or a glass fiber composite material. Although composite materials provide a reduced weight/strength ratio over traditional metal materials, it may be difficult to couple composite materials to metal components to transfer significant loads between each other, especially under tension. Conventional methods of attaching composite materials to other materials, such as threading or drilling holes in the composite material, may significantly reduce the structural performance of the composite material, including structural performance of the joint due to introduced stress concentrations in the vicinity of the threading or the holes. Other conventional methods may include bonding or gluing to provide a load path between two or more components. However, strength limits of such bonding or gluing implementations are limited by properties of the corresponding gluing materials, i.e., advanced properties of highly efficient fibers are not fully used.

In various embodiments, metallic/composite joint 200 may comprise a joint suitable for use in body-type landing gear systems. Further, metallic/composite joint 200 may comprise a joint suitable for use in other systems, including, actuators, flight control systems, wing and nose landing gear systems, and any other system which utilizes metallic/composite joints, including non-aircraft systems.

Composite member 210 may comprise a cylinder 214 having a flared end 212. Composite member 210 may extend along centerline axis 270. Composite member 210 may comprise terminus 218. Flared end 212 may comprise an outer surface 216. Outer surface 216 may be oriented at a first angle ($\alpha_1$) with respect to centerline axis 270. In various embodiments, outer surface 216 may comprise a radially outer surface.

Metallic member 220 may perimetrically surround composite member 210. Metallic member 220 may at least partially perimetrically surround flared end 212 of composite member 210. Metallic member 220 may comprise an inner surface 222. Inner surface 222 may be oriented at a second angle ($\alpha_2$) with respect to centerline axis 270. In various embodiments, inner surface 222 may comprise a radially inner surface.

In various embodiments, first angle ($\alpha_1$) may be greater than second angle ($\alpha_2$). In various embodiments, the difference between first angle ($\alpha_1$) and second angle ($\alpha_2$) (i.e., $\Delta\alpha$) may be between one-tenth degree and four degrees (0.1°-4°), and in various embodiments, between one-tenth degree and two degrees (0.1°-2°), and in various embodiments, between a quarter degree and two degrees (0.25°-2°), and in various embodiments, between one-half degree and one and one-half degree (0.5°-1.5°). In various embodiments, when first angle ($\alpha_1$) and second angle ($\alpha_2$) vary in the axial direction (i.e., $\alpha_1(z)$ and $\alpha_2(z)$), the aforementioned ranges of $\Delta\alpha$ may comprise maximum differences between $\alpha_1(z)$ and ($\alpha_2(z)$).

With continued reference to FIG. 2A, flared end 212 may be formed of a lightweight fiber-reinforced polymer matrix composite material. For example, flared end 212 may comprise the same material as cylinder 214. Flared end 212 may be configured to provide a flared surface to engage with a metal component, such as metallic member 220 for example. Flared end 212 may be secured against and held within metallic member 220, eliminating the need for threading or drilling of flared end 212 and/or cylinder 214, which may reduce the strength of and/or compromise the structural integrity of composite member 210. In various embodiments, flared end 212 may be secured against and held within metallic member 220 through mutual compression at their contact surfaces (i.e., outer surface 216 and inner surface 222), generated via axial tension.

Cylinder 214 and flared end 212 may be formed by laying composite sheets or layers in a desired shape and bonding the layers together using resins, adhesives, or other bonding agents. In various embodiments, cylinder 214 and flared end 212 may be formed using a fiber-wound fabrication process, wherein fibers are continuously wound onto the form and bonded together using resins, adhesives, or other bonding agents. Any manner of forming cylinder 214 and flared end 212 is within the scope of the present disclosure.

During or after formation, flared end 212 may be pretensioned. For example, flared end 212 may be pretensioned for tensile and/or compressive loads. Such pretensioning may reduce fretting and/or extend the fatigue life of flared end 212.

In various embodiments, inner surface 222 of metallic member 220 and outer surface 216 of composite member 210 may be separated by a first gap ($H_1$) at a first location 271 and may be separated by a second gap ($H_2$) at a second location 272, before mutual assembly. The first gap $H_1$ may be greater than the second gap $H_2$. First location 271 may be axially spaced from second location 272. The first location 271 may be located further axially inward (in the positive z-direction) from terminus 218 of composite member 210 than the second location 272. In various embodiments, the second location 272 may be at the terminus 218 of composite member 210. In various embodiments, the second location 272 may be in close proximity to the terminus 218 of composite member 210. The first gap and the second gap may be measured in a direction substantially orthogonal to the centerline axis 270, as illustrated in FIG. 2A.

Figure 2F:
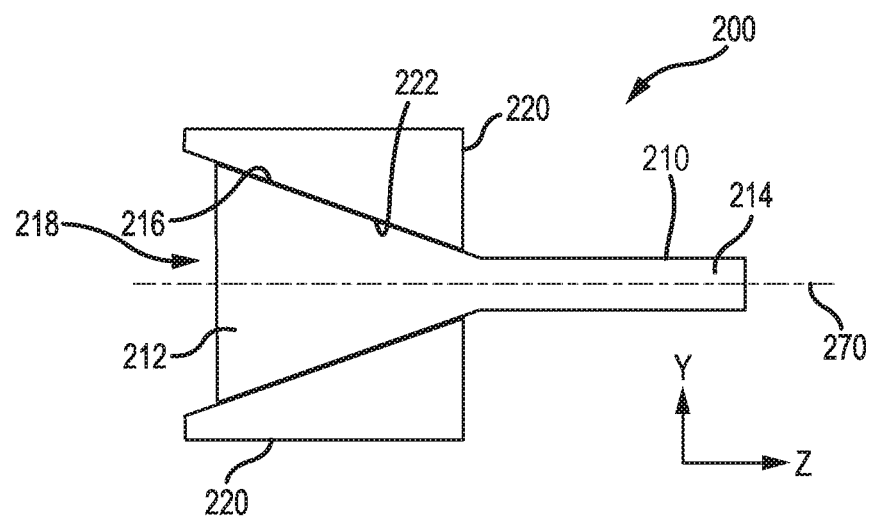
FIG. 2F illustrates the axial cross-section view of the metallic/composite joint of FIG. 2A, in an assembled and compressed position, in accordance with various embodiments.

With reference to FIG. 2F, metallic/composite joint 200 is illustrated in an assembled and compressed position. In various embodiments, metallic/composite joint 200 may be assembled by pulling together composite member 210 and metallic member 220. In this regard, upon mutual assembly of composite member 210 and metallic member 220, an axial tension load may be applied so the composite member 210 and the metallic member 220 move along the centerline axis 270, but in the opposite directions (in the positive z-direction and in the negative z-direction, respectively). In various embodiments, metallic joint 200 may be assembled by pushing together composite member 210 and metallic member 220. In this regard, upon mutual assembly of composite member 210 and metallic member 220, an axial compression load may be applied so the composite member 210 and the metallic member 220 move along the centerline axis 270, but in opposite directions (in the positive z-direction and in the negative z-direction, respectively). In this regard, the gaps between inner surface 222 and outer surface 216 may close due to deformation of composite member 210. In various embodiments, these gaps may close due to mutual deformation of metallic member 220 and composite member 210. In this regard, smaller contact pressure between inner surface 222 and outer surface 216 near location 271 may be expected and therefore lower stress concentrations may be expected near location 271. In this regard, FIGS. 2A through 2E and FIGS. 3A through 5E illustrate metallic/composite joints before contact between the metallic member and the composite member and the subsequent deformation, in accordance with various embodiments.

Figure 2B:
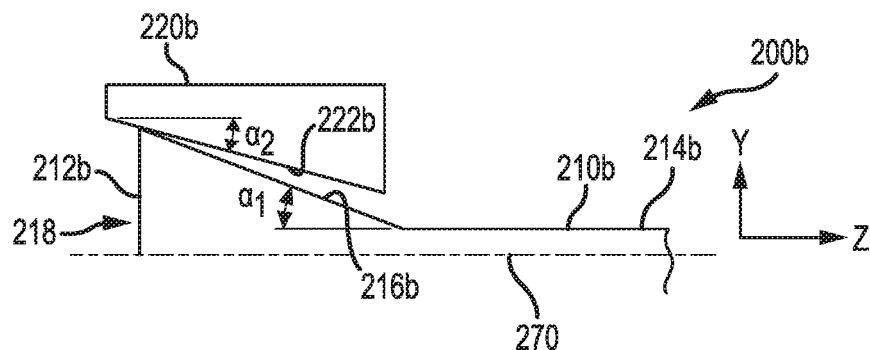
FIGS. 2B, 2C, 2D, and 2E illustrate a metallic/composite joint having various combinations of first angles and second angles, relative to a centerline axis, in accordance with various embodiments.

With reference to FIG. 2B, a partial cross section view of a metallic/composite joint 200b is illustrated, in accordance with various embodiments. Composite member 210b may comprise a cylinder 214b having a flared end 212b. Composite member 210b may extend along centerline axis 270. Flared end 212b may comprise an outer surface 216b. Outer surface 216b may be oriented at a first angle ($\alpha_1$) with respect to centerline axis 270. In various embodiments, outer surface 216b may comprise a radially outer surface.

Metallic member 220b may perimetrically surround composite member 210b. Metallic member 220b may perimetrically surround flared end 212b of composite member 210b. Metallic member 220b may comprise an inner surface 222b. Inner surface 222b may be oriented at a second angle ($\alpha_2$) with respect to centerline axis 270. In various embodiments, inner surface 222b may comprise a radially inner surface.

In various embodiments, first angle ($\alpha_1$) may be constant along the axial direction (z-direction). In this regard, inner surface 222b may comprise a linear geometry. In various embodiments, second angle ($\alpha_2$) may be constant along the axial direction (z-direction). In this regard, outer surface 216b may comprise a linear geometry.

Figure 2C:
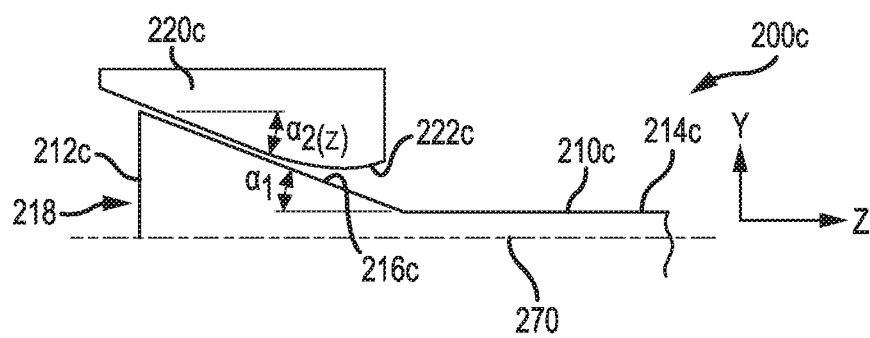

With reference to FIG. 2C, a partial cross section view of a metallic/composite joint 200c is illustrated, in accordance with various embodiments. Composite member 210c may comprise a cylinder 214c having a flared end 212c. Composite member 210c may extend along centerline axis 270. Flared end 212c may comprise an outer surface 216c. Outer surface 216c may be oriented at a first angle ($\alpha_1$) with respect to centerline axis 270. In various embodiments, outer surface 216c may comprise a radially outer surface.

Metallic member 220c may perimetrically surround composite member 210c. Metallic member 220c may perimetrically surround flared end 212c of composite member 210c. Metallic member 220c may comprise an inner surface 222c. Inner surface 222c may be oriented at a second angle ($\alpha_2$) with respect to centerline axis 270. In various embodiments, inner surface 222c may comprise a radially inner surface.

In various embodiments, first angle ($\alpha_1$) may be constant along the axial direction (z-direction). In this regard, outer surface 216c may comprise a linear geometry. In various embodiments, second angle ($\alpha_2$) may be variable along the axial direction (z-direction). In this regard, inner surface 222c may comprise a non-linear geometry along the axial direction. Second angle ($\alpha_2$) may decrease along the axial direction from terminus 218 in the axially inward direction (positive z-direction).

Figure 2D:
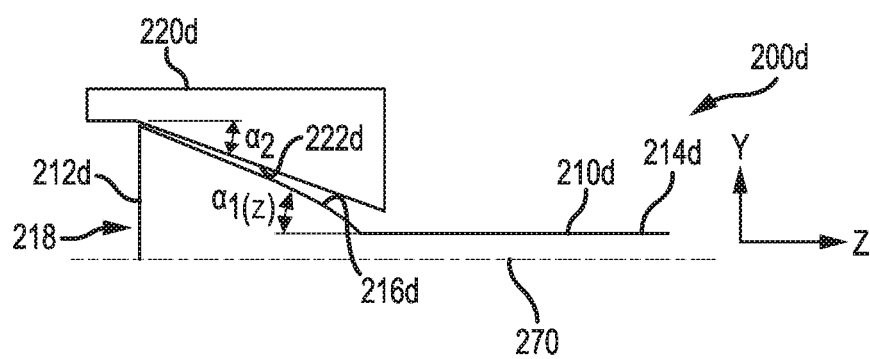

With reference to FIG. 2D, a partial cross section view of a metallic/composite joint 200d is illustrated, in accordance with various embodiments. Composite member 210d may comprise a cylinder 214d having a flared end 212d. Composite member 210d may extend along centerline axis 270. Flared end 212d may comprise an outer surface 216d. Outer surface 216d may be oriented at a first angle ($\alpha_1$) with respect to centerline axis 270. In various embodiments, outer surface 216d may comprise a radially outer surface.

Metallic member 220d may perimetrically surround composite member 210d. Metallic member 220d may perimetrically surround flared end 212d of composite member 210d. Metallic member 220d may comprise an inner surface 222d. Inner surface 222d may be oriented at a second angle ($\alpha_2$) with respect to centerline axis 270. In various embodiments, inner surface 222d may comprise a radially inner surface.

In various embodiments, first angle ($\alpha_1$) may be variable along the axial direction (z-direction). In this regard, outer surface 216d may comprise a non-linear geometry along the axial direction. In various embodiments, second angle ($\alpha_2$) may be constant along the axial direction (z-direction). In this regard, inner surface 222d may comprise a linear geometry along the axial direction. First angle ($\alpha_1$) may increase along the axial direction from terminus 218 in the axially inward direction (positive z-direction).

Figure 2E:
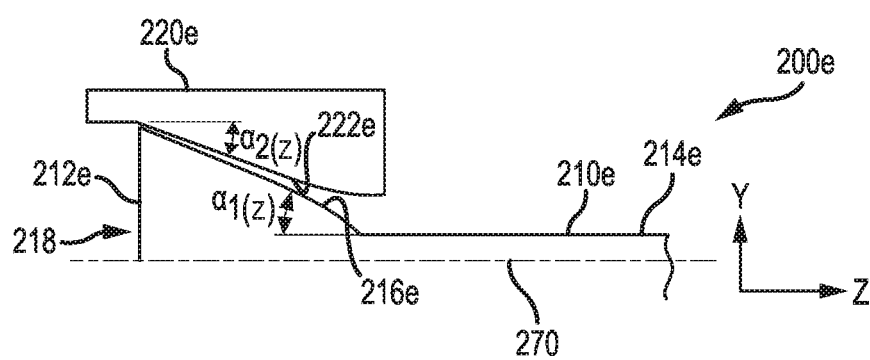

With reference to FIG. 2E, a partial cross section view of a metallic/composite joint 200e is illustrated, in accordance with various embodiments. Composite member 210e may comprise a cylinder 214e having a flared end 212e. Composite member 210e may extend along centerline axis 270. Flared end 212e may comprise an outer surface 216e. Outer surface 216e may be oriented at a first angle ($\alpha_1$) with respect to centerline axis 270. In various embodiments, outer surface 216e may comprise a radially outer surface.

Metallic member 220e may perimetrically surround composite member 210e. Metallic member 220e may perimetrically surround flared end 212e of composite member 210e. Metallic member 220e may comprise an inner surface 222e. Inner surface 222e may be oriented at a second angle ($\alpha_2$) with respect to centerline axis 270. In various embodiments, inner surface 222e may comprise a radially inner surface.

In various embodiments, first angle ($\alpha_1$) may be variable along the axial direction (z-direction). In various embodiments, second angle ($\alpha_2$) may be variable along the axial direction (z-direction). In this regard, both inner surface 222e and outer surface 216e may comprise non-linear geometries along the axial direction. First angle ($\alpha_1$) may increase along the axial direction from terminus 218 in the axially inward direction (positive z-direction). Second angle ($\alpha_2$) may decrease along the axial direction from terminus 218 in the axially inward direction (positive z-direction).

Figure 3A:
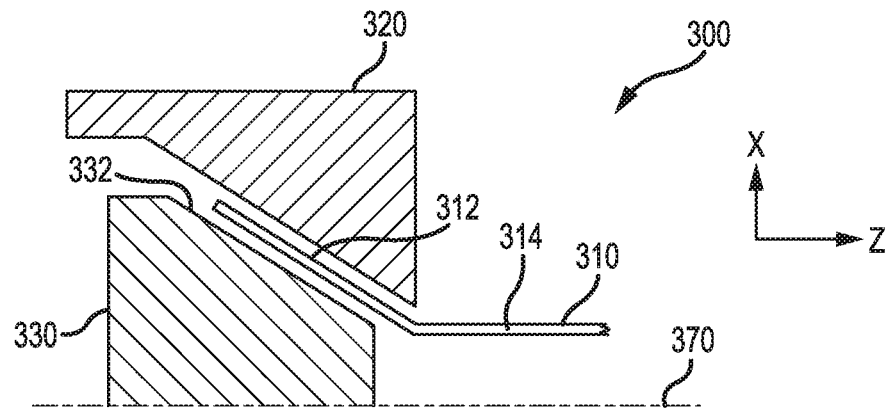
FIG. 3A illustrates a cross-section view of a metallic/composite joint, in accordance with various embodiments.

With reference to FIG. 3A, a cross section view of a metallic/composite joint 300 including composite member 310, member (also referred to herein as metallic member) 320, and insert 330 is illustrated, in accordance with various embodiments. Xz-axes are provided for ease of illustration. Metallic/composite joint 300 may be similar to metallic/composite joint 200 (see FIG. 2A) except that metallic/composite joint 300 further includes insert 330. Composite member 310 may be similar to composite member 210 (see FIG. 2A) and may comprise a cylinder 314 having a flared end 312. Member 320 may be similar to metallic member 220 (see FIG. 2A), in accordance with various embodiments.

In various embodiments, insert 330 may be positioned within flared end 312. In this regard, at least a portion of insert 330 may be located within flared end 312. Flared end 312 may comprise a frustoconical geometry. In various embodiments, insert 330 may comprise a frustoconical geometry. In various embodiments, insert 330 may comprise a convex geometry, at outer surface 332. In various embodiments, insert 330 may comprise a concave geometry, at outer surface 332. The geometry of insert 330 may be complementary to the geometry of flared end 312. In various embodiments, insert 330 may be positioned within flared end 312 and held under compression by components located outside of composite member 310. In various embodiments, insert 330 may be bonded or glued to composite member 310. In various embodiments, insert 330 may be placed within flared end 312 during formation of cylinder 314 and flared end 312. In various embodiments, insert 330 may be placed within flared end 312 after formation of cylinder 314 and flared end 312.

Insert 330 and/or member 320 may comprise, for example, a metallic material. However, insert 330 and/or member 320 may comprise any suitable material for retaining composite member 310 in response to axial loading. For example, member 320 may comprise a composite member having fibers primarily oriented in the hoop direction. In this case, member 320 may comprise different materials than composite member 310.

Figure 3B:
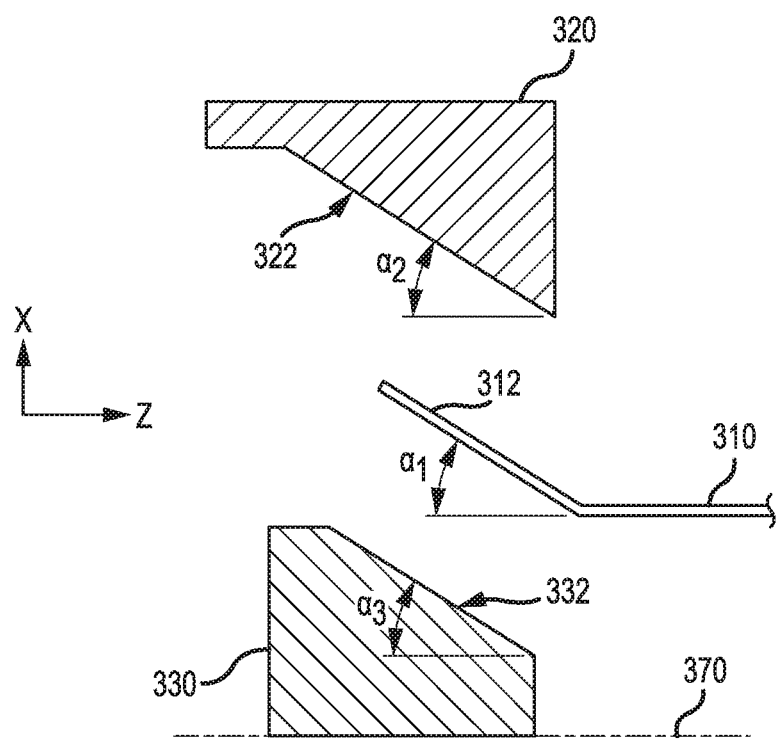
FIG. 3B illustrates an exploded, cross-section view of metallic/composite joint of FIG. 3A, in accordance with various embodiments.
Figure 3C:
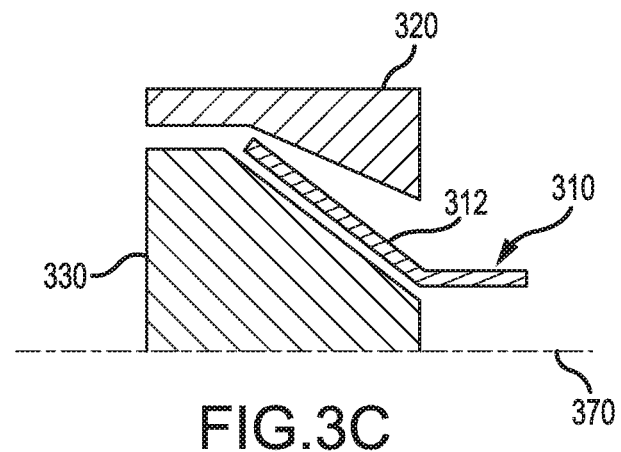
FIGS. 3C, 3D, and 3E illustrate a metallic/composite joint having various combinations of first angles, second angles, and third angles, relative to a centerline axis, in accordance with various embodiments.
Figure 3D:
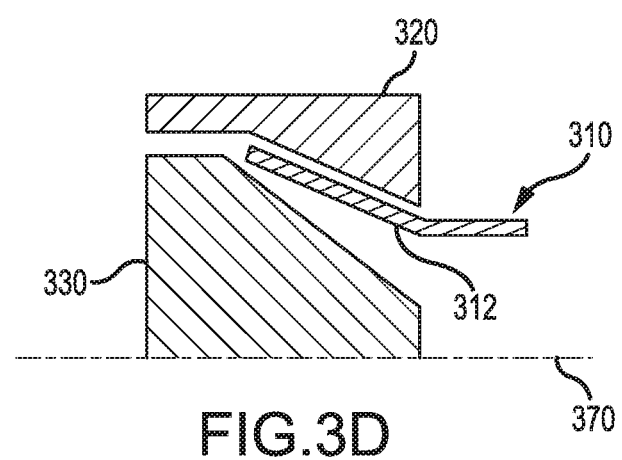
Figure 3E:
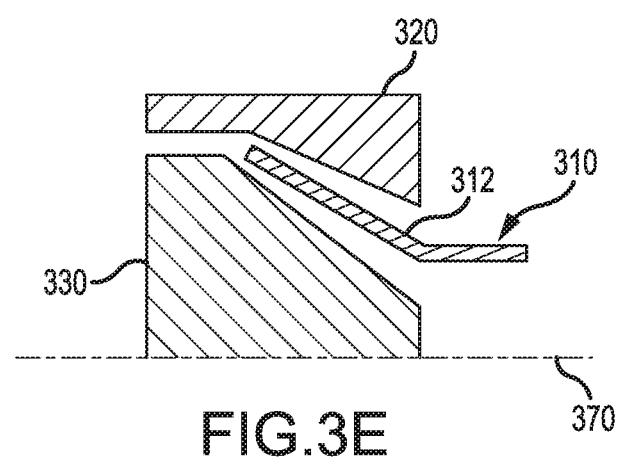

With combined reference to FIG. 3A and FIG. 3B, flared end 312 may extend in a direction oriented at a first angle ($\alpha_1$) relative to centerline axis 370. Inner surface 322 of member 320 may be oriented at a second angle ($\alpha_2$) relative to centerline axis 370. Outer surface 332 of insert 330 may be oriented at a third angle ($\alpha_3$) relative to centerline axis 370. In various embodiments, the first angle ($\alpha_1$) is greater than the second angle ($\alpha_2$) and the third angle ($\alpha_3$) is substantially equal to the first angle ($\alpha_1$) as illustrated in FIG. 3C. In various embodiments, the first angle ($\alpha_1$) is substantially equal to the second angle ($\alpha_2$) and the third angle ($\alpha_3$) is greater than to the first angle ($\alpha_1$) as illustrated in FIG. 3D. In various embodiments, the first angle ($\alpha_1$) is greater than the second angle ($\alpha_2$) and the third angle ($\alpha_3$) is greater than to the first angle ($\alpha_1$) as illustrated in FIG. 3E.

Figure 4A:
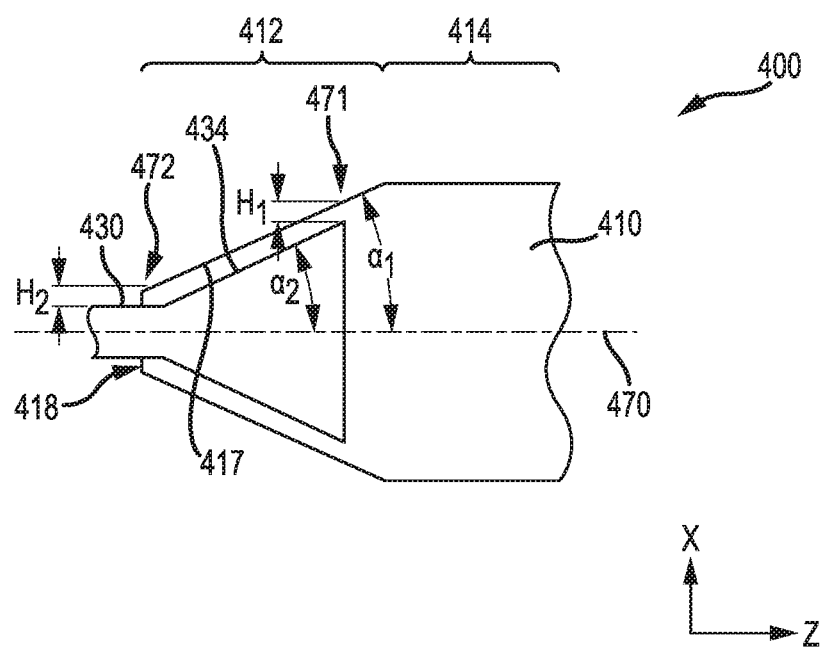
FIG. 4A illustrates an axial cross-section view of a metallic/composite joint, in accordance with various embodiments.

With reference to FIG. 4A, a metallic/composite joint 400 is illustrated, in accordance with various embodiments. Metallic/composite joint 400 may comprise an insert 430 and a composite member 410. Composite member 410 may extend along centerline axis 470. Composite member 410 may comprise a cylinder 414 having an angled end 412. Angled end 412 may be bent inward (or drawn in) towards centerline axis 470. Composite member 410 may comprise terminus 418. Angled end 412 may comprise an inner surface 417. Inner surface 417 may be oriented at a first angle ($\alpha_1$) with respect to centerline axis 470. In various embodiments, inner surface 417 may comprise a radially inner surface.

Insert 430 may be located within angled end 412. Angled end 412 may perimetrically surround insert 430. Insert 430 may comprise an outer surface 434. Outer surface 434 may be oriented at a second angle ($\alpha_2$) with respect to centerline axis 470. In various embodiments, outer surface 434 may comprise a radially outer surface.

In various embodiments, outer surface 434 of insert 430 and inner surface 417 of composite member 410 may be separated by a first gap ($H_1$) at a first location 471 and may be separated by a second gap ($H_2$) at a second location 472. The first gap $H_1$ may be greater than the second gap $H_2$. First location 471 may be axially spaced from second location 472. The first location 471 may be located further axially inward (in the positive z-direction) from terminus 418 of composite member 410 than the second location 472. In various embodiments, the second location 472 may be at the terminus 418 of composite member 410. The first gap and the second gap may be measured in a direction substantially orthogonal to the centerline axis 470, as illustrated in FIG. 4A.

Figure 4B:
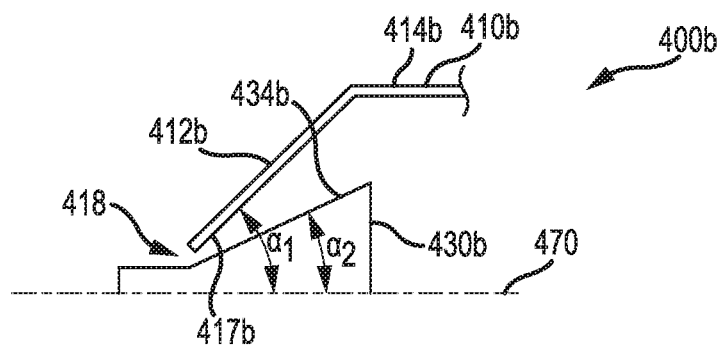
FIGS. 4B, 4C, 4D, and 4E illustrate a metallic/composite joint having various combinations of first angles and second angles, relative to a centerline axis, in accordance with various embodiments.

With reference to FIG. 4B, a metallic/composite joint 400b is illustrated, in accordance with various embodiments. Metallic/composite joint 400b may comprise an insert 430b and a composite member 410b. Composite member 410b may extend along centerline axis 470. Composite member 410b may comprise a cylinder 414b having an angled end 412b. Angled end 412b may be angled toward centerline axis 470. Composite member 410b may comprise terminus 418. Angled end 412b may comprise an inner surface 417b. Inner surface 417b may be oriented at a first angle ($\alpha_1$) with respect to centerline axis 470. In various embodiments, inner surface 417b may comprise a radially outer surface.

Insert 430b may located within angled end 412b. Angled end 412b may perimetrically surround insert 430b. Insert 430b may comprise an outer surface 434b. Outer surface 434b may be oriented at a second angle ($\alpha_2$) with respect to centerline axis 470. In various embodiments, outer surface 434b may comprise a radially outer surface.

In various embodiments, first angle ($\alpha_1$) may be constant along the axial direction (z-direction). In this regard, inner surface 417b may comprise a linear geometry. In various embodiments, second angle ($\alpha_2$) may be constant along the axial direction (z-direction). In this regard, outer surface 434b may comprise a linear geometry. First angle ($\alpha_1$) may be greater than second angle ($\alpha_2$).

Figure 4C:
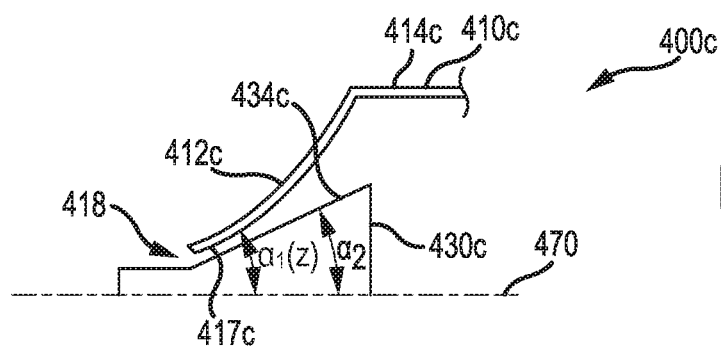

With reference to FIG. 4C, a metallic/composite joint 400c is illustrated, in accordance with various embodiments. Metallic/composite joint 400c may comprise an insert 430c and a composite member 410c. Composite member 410c may extend along centerline axis 470. Composite member 410c may comprise a cylinder 414c having an angled end 412c. Angled end 412c may be drawn in toward centerline axis 470. Composite member 410c may comprise terminus 418. Angled end 412c may comprise an inner surface 417c. Inner surface 417c may be oriented at a first angle ($\alpha_1$) with respect to centerline axis 470. In various embodiments, inner surface 417c may comprise a radially inner surface.

Insert 430c may located within angled end 412c. Angled end 412c may perimetrically surround insert 430c. Insert 430c may comprise an outer surface 434c. Outer surface 434c may be oriented at a second angle ($\alpha_2$) with respect to centerline axis 470. In various embodiments, outer surface 434c may comprise a radially outer surface.

In various embodiments, first angle ($\alpha_1$) may be variable along the axial direction (z-direction). In this regard, inner surface 417c may comprise a non-linear geometry. In various embodiments, second angle ($\alpha_2$) may be constant along the axial direction (z-direction). In this regard, outer surface 434c may comprise a linear geometry. First angle ($\alpha_1$) may increase along the axial direction from terminus 418 in the axially inward direction (positive z-direction).

Figure 4D:
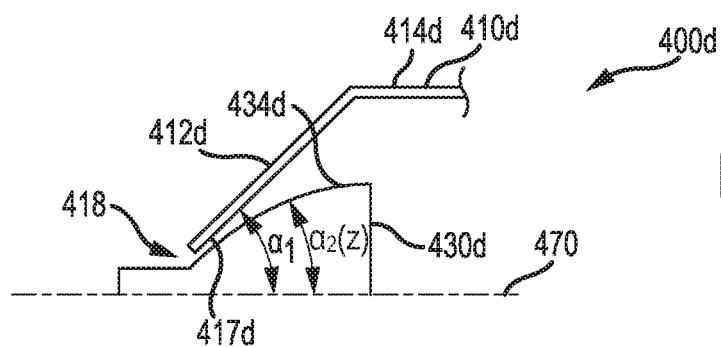

With reference to FIG. 4D, a metallic/composite joint 400d is illustrated, in accordance with various embodiments. Metallic/composite joint 400d may comprise an insert 430d and a composite member 410d. Composite member 410d may extend along centerline axis 470. Composite member 410d may comprise a cylinder 414d having an angled end 412d. Angled end 412d may be drawn in toward centerline axis 470. Composite member 410d may comprise terminus 418. Angled end 412d may comprise an inner surface 417d. Inner surface 417d may be oriented at a first angle ($\alpha_1$) with respect to centerline axis 470. In various embodiments, inner surface 417d may comprise a radially inner surface.

Insert 430d may located within angled end 412d. Angled end 412d may perimetrically surround insert 430d. Insert 430d may comprise an outer surface 434d. Outer surface 434d may be oriented at a second angle ($\alpha_2$) with respect to centerline axis 470. In various embodiments, outer surface 434d may comprise a radially outer surface.

In various embodiments, first angle ($\alpha_1$) may be constant along the axial direction (z-direction). In this regard, inner surface 417d may comprise a linear geometry. In various embodiments, second angle ($\alpha_2$) may be variable along the axial direction (z-direction). In this regard, outer surface 434d may comprise a non-linear geometry. Second angle ($\alpha_2$) may decrease along the axial direction from terminus 418 in the axially inward direction (positive z-direction).

Figure 4E:
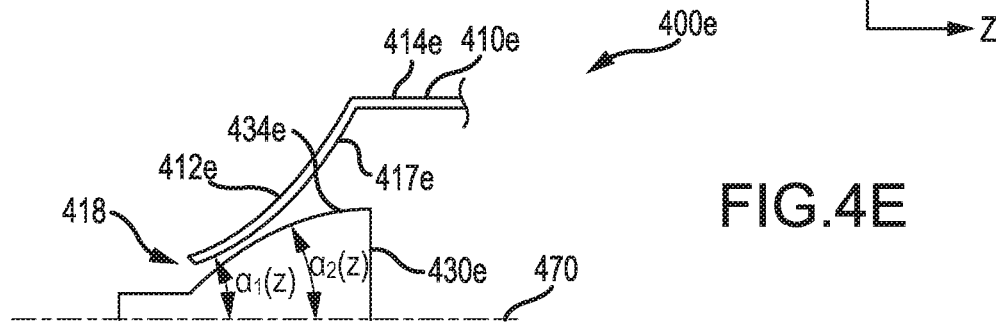

With reference to FIG. 4E, a metallic/composite joint 400e is illustrated, in accordance with various embodiments. Metallic/composite joint 400e may comprise an insert 430e and a composite member 410e. Composite member 410e may extend along centerline axis 470. Composite member 410e may comprise a cylinder 414e having an angled end 412e. Angled end 412e may be drawn in toward centerline axis 470. Composite member 410e may comprise terminus 418. Angled end 412e may comprise an inner surface 417e. Inner surface 417e may be oriented at a first angle ($\alpha_1$) with respect to centerline axis 470. In various embodiments, inner surface 417e may comprise a radially inner surface.

Insert 430e may located within angled end 412e in various embodiments, angled end 412e may comprise a concave geometry. Angled end 412e may perimetrically surround insert 430e. Insert 430e may comprise an outer surface 434e. Outer surface 434e may be oriented at a second angle ($\alpha_2$) with respect to centerline axis 470. In various embodiments, outer surface 434e may comprise a radially outer surface.

In various embodiments, both first angle ($\alpha_1$) and second angle ($\alpha_2$) may be variable along the axial direction (z-direction). In this regard, both inner surface 417e and outer surface 434e may comprise a non-linear geometry. In this regard, inner surface 417e and outer surface 434e may comprise a rounded surface. In various embodiments, inner surface 417e and outer surface 434e may comprise convex surfaces. First angle ($\alpha_1$) may increase along the axial direction from terminus 418 in the axially inward direction (positive z-direction). Second angle ($\alpha_2$) may decrease along the axial direction from terminus 418 in the axially inward direction (positive z-direction).

Figure 5A:
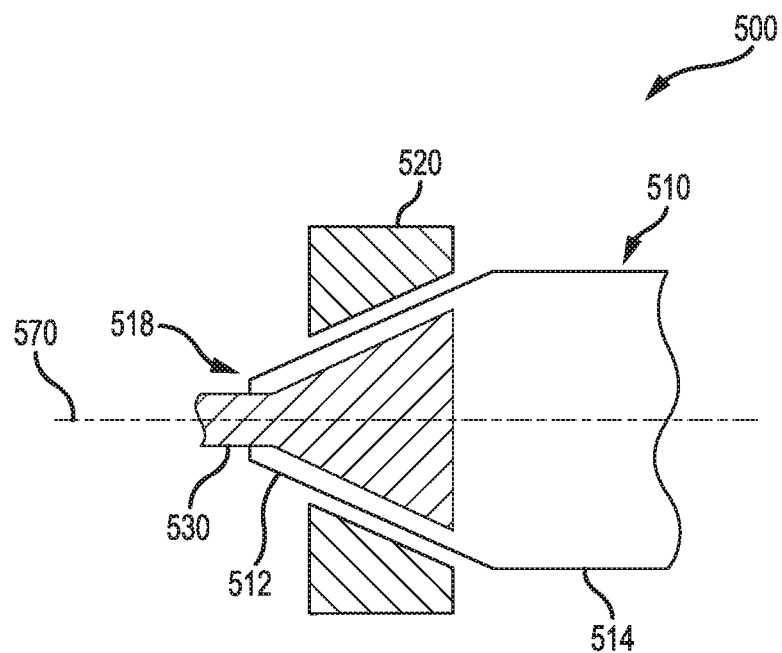
FIG. 5A illustrates a cross-section view of a metallic/composite joint, in accordance with various embodiments.

With reference to FIG. 5A, a metallic/composite joint 500 is illustrated, in accordance with various embodiments. Metallic/composite joint 500 may be similar to metallic/composite joint 400 (see FIG. 4A) except that metallic/composite joint additionally includes metallic member 520. In this regard, metallic/composite joint 500 may comprise insert 530, composite member 510, and metallic member 520. Composite member 510 may extend along centerline axis 570. Composite member 510 may comprise a cylinder 514 having an angled end 512. Angled end 512 may be drawn in toward centerline axis 570. Composite member 510 may comprise terminus 518.

Figure 5B:
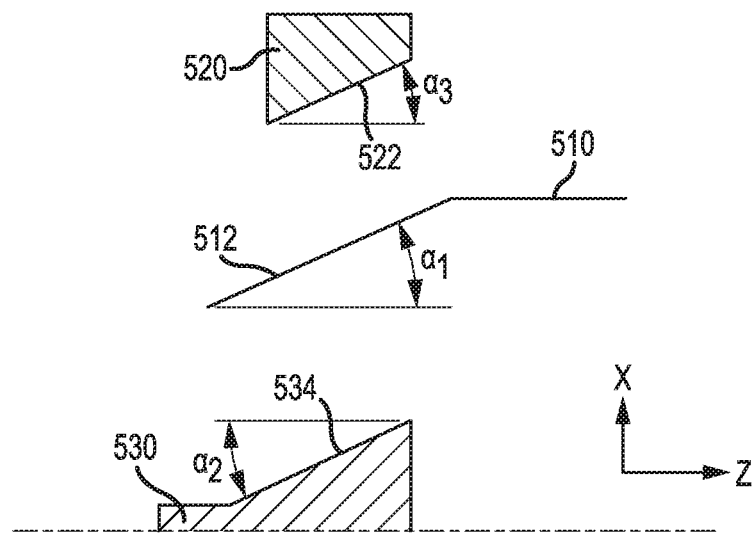
FIG. 5B illustrates a partial cross-section view of a metallic/composite joint, in accordance with various embodiments.
Figure 5C:
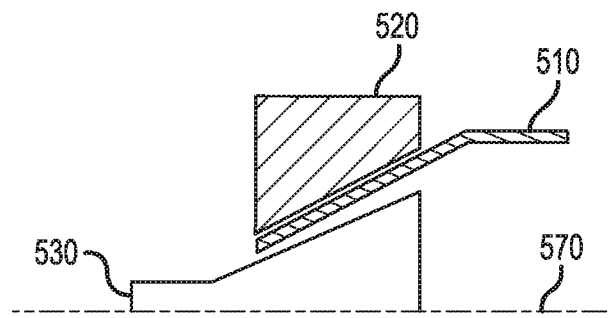
FIGS. 5C, 5D, and 5E illustrate a metallic/composite joint having various combinations of first angles, second angles, and third angles, relative to a centerline axis, in accordance with various embodiments.
Figure 5D:
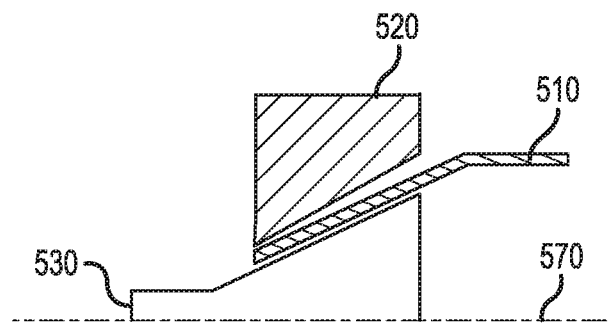
Figure 5E:
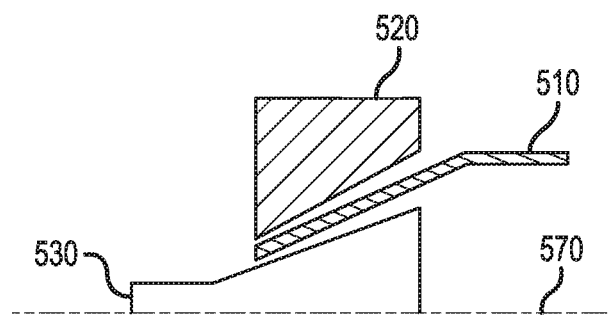

With combined reference to FIG. 5A and FIG. 5B, angled end 512 may be oriented at a first angle ($\alpha_1$) with respect to centerline axis 570. In various embodiments, outer surface 534 of insert 530 may be oriented at a second angle ($\alpha_2$) with respect to centerline axis 570. In various embodiments, inner surface 522 of metallic member 520 may be oriented at a third angle ($\alpha_3$) with respect to centerline axis 570. In various embodiments, the first angle ($\alpha_1$) is greater than the second angle ($\alpha_2$) and the third angle ($\alpha_3$) is substantially equal to the first angle ($\alpha_1$) as illustrated in FIG. 5C. In various embodiments, the first angle ($\alpha_1$) is substantially equal to the second angle ($\alpha_2$) and the third angle ($\alpha_3$) is greater than to the first angle ($\alpha_1$) as illustrated in FIG. 5D. In various embodiments, the first angle ($\alpha_1$) is greater than the second angle ($\alpha_2$) and the third angle ($\alpha_3$) is greater than to the first angle ($\alpha_1$) as illustrated in FIG. 5E.

Figure 6A:
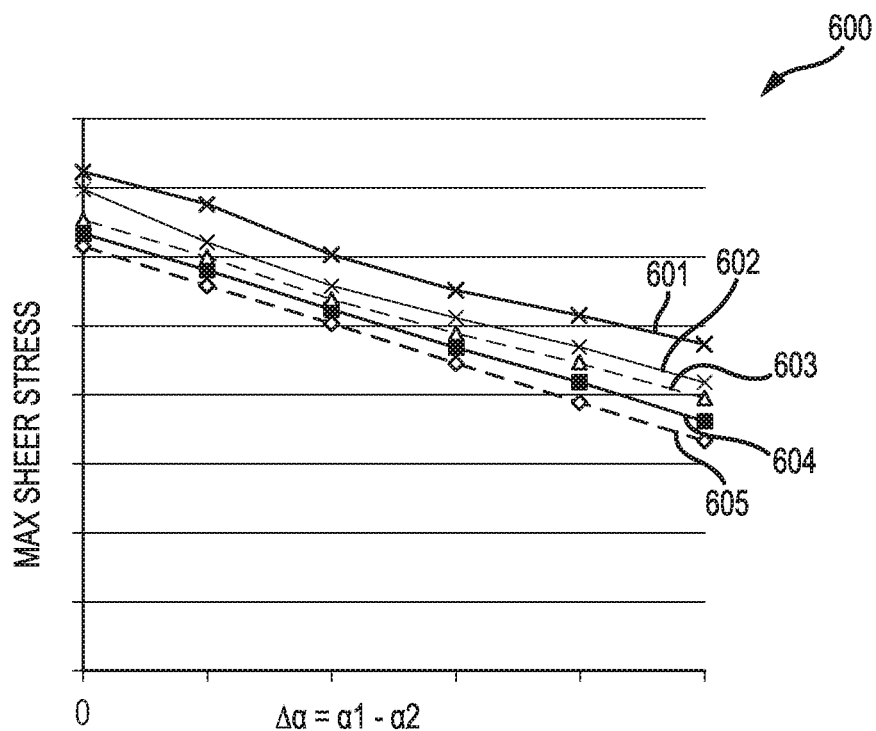
FIGS. 6A and 6B illustrate a plot of maximum shear stress and maximum axial stress, respectively, in a composite member in the area of a metallic/composite joint under tension versus the difference between a first angle and a second angle of the metallic/composite joint, in accordance with various embodiments.

With combined reference to FIG. 3A and FIG. 6A, a plot 600 of max shear stress of composite member 310 versus the difference between the first angle ($\alpha_1$) and the second angle ($\alpha_2$), defined by $\alpha_1-\alpha_2=\Delta\alpha$, is illustrated. In this example, $\alpha_3=\alpha_1$. This max shear stress may be calculated via finite element methods. Plot 600 illustrates that as the difference between the first angle ($\alpha_1$) and the second angle ($\alpha_2$) increases, the maximum shear stress of composite member 310 decreases. In this regard, providing a metallic/composite joint 300 having a positive difference between the first angle ($\alpha_1$) and the second angle ($\alpha_2$), may reduce the maximum shear stress of composite member 310.

Plot 600 illustrates line 601, line 602, line 603, line 604, and line 605. Line 601, line 602, line 603, line 604, and line 605 may be representative of various levels of compression between insert 330 and member 320 of metallic/composite joint 300. Lines 601-605 represent the measured maximum shear stress of composite member 310 under the same tension and under varying degrees of compression between insert 330 and member 320, the magnitude of the compression represented by line 601 being greater than that of line 602, the magnitude of the compression represented by line 602 being greater than that of line 603, the magnitude of the compression represented by line 603 being greater than that of line 604, and the magnitude of the compression represented by line 604 being greater than that of line 605.

Figure 6B:
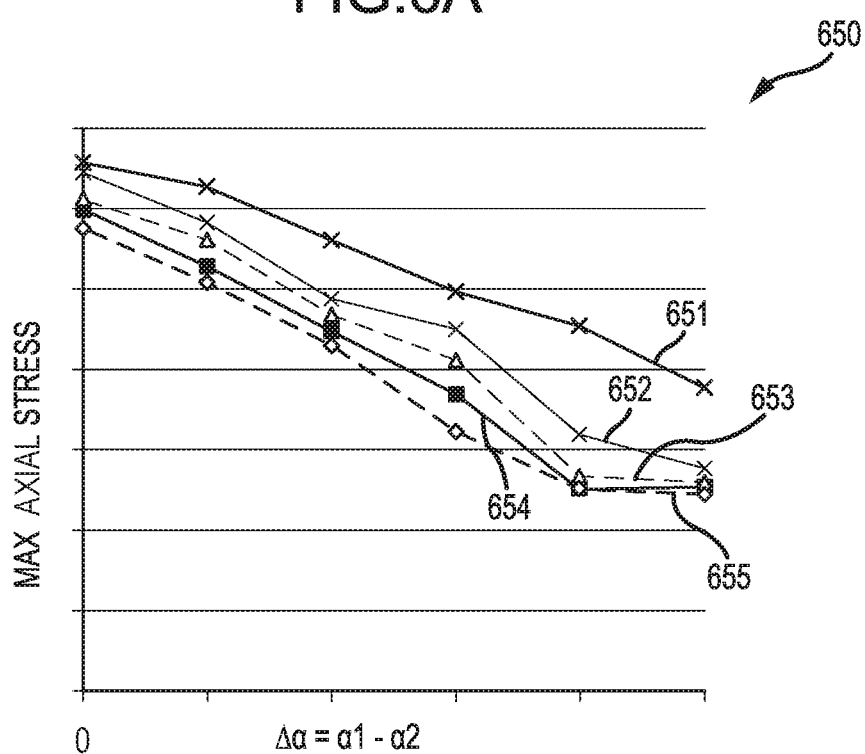

With combined reference to FIG. 3A and FIG. 6B, a plot 650 of maximum axial stress in composite member 310 versus the difference between the first angle ($\alpha_1$) and the second angle ($\alpha_2$) (i.e., $\Delta\alpha$) is illustrated. In this example, $\alpha_3=\alpha_1$. Plot 650 illustrates that as the difference between the first angle ($\alpha_1$) and the second angle ($\alpha_2$) increases, the maximum axial stress of composite member 310 decreases. In this regard, providing a metallic/composite joint 300 having a positive difference between the first angle ($\alpha_1$) and the second angle ($\alpha_2$), may reduce the maximum axial stress of composite member 310.

Plot 650 illustrates line 651, line 652, line 653, line 654, and line 655. Line 651, line 652, line 653, line 654, and line 655 may be representative of various levels of compression between insert 330 and member 320 of metallic/composite joint 300. Lines 651-655 represent the calculated maximum axial stress of composite member 310 under the same tension and under varying degrees of compression between insert 330 and member 320, the magnitude of the compression represented by line 651 being greater than that of line 652, the magnitude of the compression represented by line 652 being greater than that of line 653, the magnitude of the compression represented by line 653 being greater than that of line 654, and the magnitude of the compression represented by line 654 being greater than that of line 655.

Figure 7A:
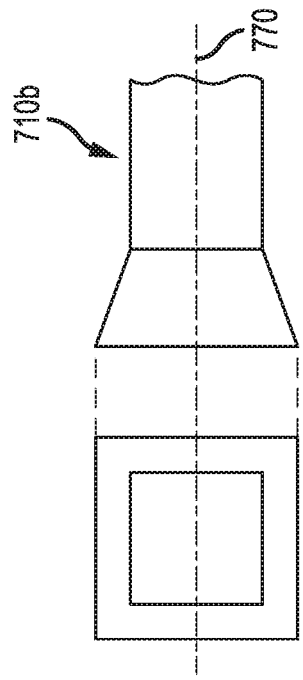
FIGS. 7A, 7B, 7C, and 7D illustrate various cross-section geometries of a composite member in a plane perpendicular to the axial direction, in accordance with various embodiments.
Figure 7B:
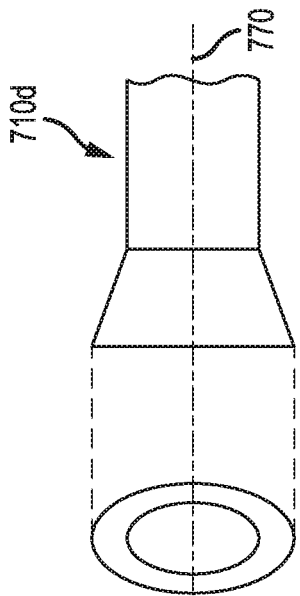
Figure 7C:
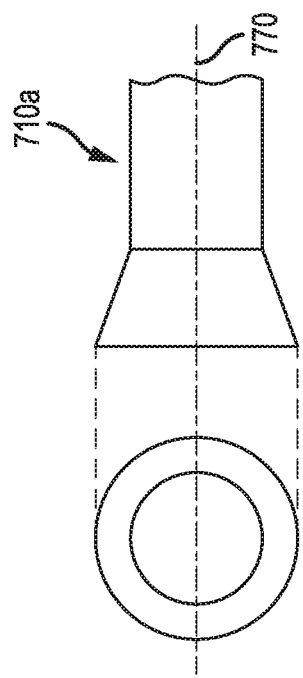
Figure 7D:
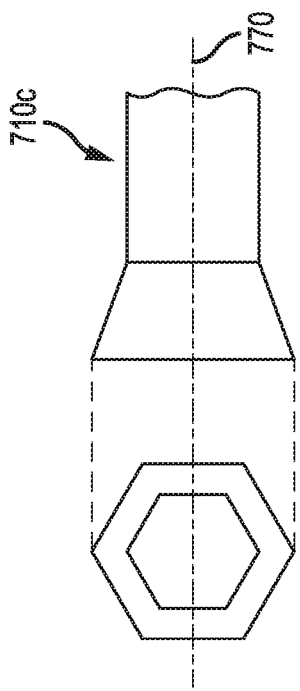

With reference to FIGS. 7A through 7D, composite members 710a through 710d may be similar to composite member 210 of FIG. 2A. In various embodiments, a composite member may comprise various geometries. In various embodiments, the geometry of composite member 710a, as viewed from a cross-section orthogonal to the centerline axis 770, may comprise a circular geometry as illustrated in FIG. 7A. In various embodiments, the geometry of composite member 710b, as viewed from a cross-section orthogonal to the centerline axis 770, may comprise a rectangular geometry as illustrated in FIG. 7B. In various embodiments, the geometry of composite member 710c, as viewed from a cross-section orthogonal to the centerline axis 770, may comprise a polygonal geometry with three or more sides, for example with six sides as illustrated in FIG. 7C. In various embodiments, the geometry of composite member 710d, as viewed from a cross-section orthogonal to the centerline axis 770, may comprise any convex geometry consisting of a combination of linear and/or non-linear segments, for example an ellipsoidal geometry, as illustrated in FIG. 7D.

Figure 8A:
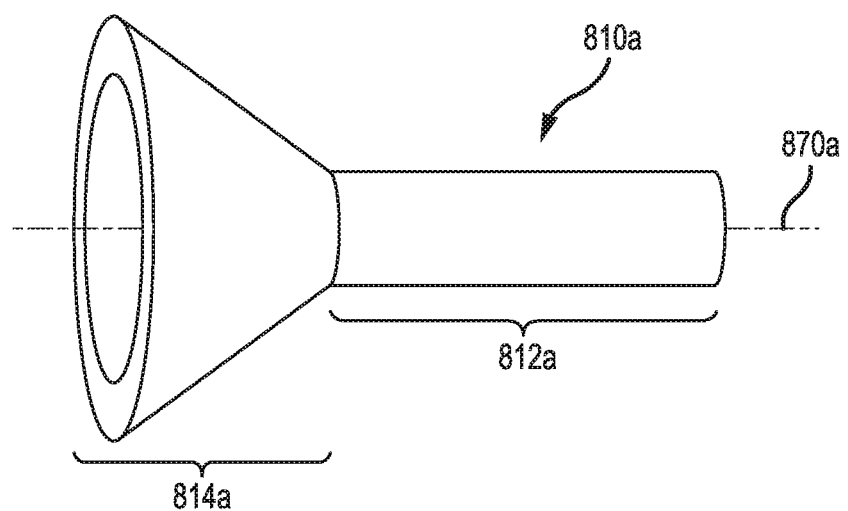
FIGS. 8A and 8B illustrate various geometries of a composite member, in accordance with various embodiments.
Figure 8B:
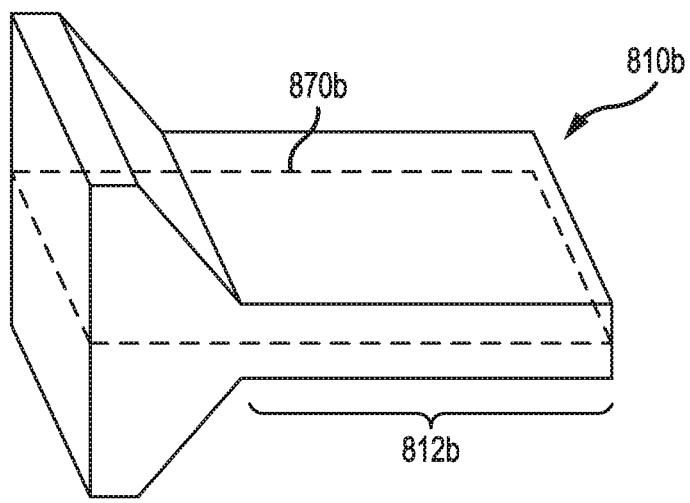

With reference to FIG. 8A and FIG. 8B, composite members 810a, 810b may be similar to composite member 210 of FIG. 2A. Composite member 810a may be axisymmetric with respect to centerline axis 870a. In this regard, cylindrical portion 812a and flared end 814a of composite member 810a may comprise rotational symmetry about centerline axis 870a. Composite member 810a may also comprise other non-axi-symmetric cross-sectional geometries, as illustrated in FIGS. 7B through FIG. 7D and FIG. 8B. While cylindrical portion 812b of composite member 810b may not comprise rotational symmetry about a centerline axis, cylindrical portion 812b may comprise axial symmetry along centerline plane 870b.

Figure 9:
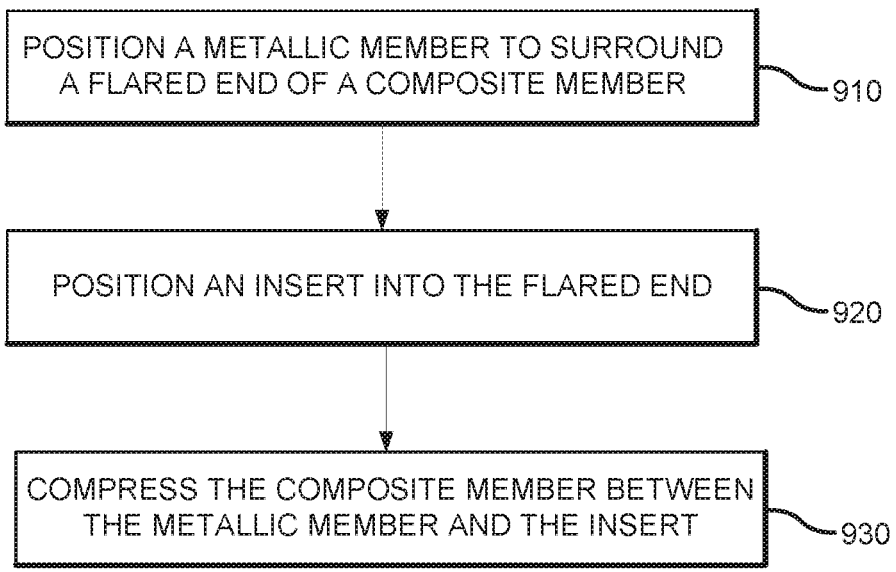
FIG. 9 provides a method for reducing a maximum shear stress in a metallic/composite joint, in accordance with various embodiments.

With reference to FIG. 9, a method 900 for reducing a maximum shear stress in a metallic/composite joint is provided, in accordance with various embodiments. Method 900 includes positioning a metallic member to perimetrically surround a flared end of a composite member (step 910). Method 900 may include positioning an insert into the flared end (step 920). Method 900 may include compressing the composite member between the metallic member and the insert (step 930).

With combined reference to FIG. 2A and FIG. 9, step 910 may include positioning metallic member 220 to perimetrically surround flared end 212 of composite member 210 such that inner surface 222 of metallic member 220 and outer surface 216 of flared end 212 are separated by a first gap $H_1$ at first location 271 and are separated by second gap $H_2$ at second location $H_2$. Inner surface 222 and outer surface 216 may be separated by first gap $H_1$ at first location 271 and separated by second gap $H_2$ at second location 272 before being mutually compressed during installation. With additional reference to FIG. 3B, step 920 may include positioning insert 330 at least partially into flared end 312 of composite member 310. Step 930 may include compressing composite member 310 between member 320 and insert 330. The compressing may comprise moving insert 330 in the axial direction (i.e., the positive z-direction) relative to member 320. The compressing may comprise moving member 320 in the axial direction (i.e., the negative z-direction) relative to insert 330. In various embodiments, the first gap $H_1$ and the second gap $H_2$ may essentially disappear in response to the compressing. For example, with additional reference to FIG. 2F, inner surface 222 and outer surface 216 may directly contact in response to said compression, in accordance with various embodiments. It should be noted, that although the first gap $H_1$ and the second gap $H_2$ may disappear in response to said compression, the distribution of contact pressure between inner surface 222 and outer surface 216 is expected to be different than if first gap $H_1$ and the second gap $H_2$ had each been equal to one another prior to the compression. In this regard, the first gap $H_1$ and the second gap $H_2$ may decrease in response to the compression.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metallic/composite joint comprising:
   a composite member comprising a cylinder having a flared end extending along a centerline axis, an outer surface of the flared end oriented at a first angle relative to the centerline axis;
   a metallic member parametrically surrounding the outer surface of the flared end and having an inner surface oriented at a second angle relative to the centerline axis,
   wherein the inner surface of the metallic member and the outer surface of the composite member are separated by a first gap at a first location and are separated by a second gap at a second location, the first gap being greater than the second gap, the first location being axially spaced from the second location, and the first gap and the second gap being measured in a direction substantially orthogonal to the centerline axis,
   the cylinder comprises a fiber-reinforced polymer matrix composite, and the flared end comprises the fiber-reinforced polymer matrix composite,
   wherein the inner surface of the metallic member comprises a non-linear convex geometry.

2. The metallic/composite joint of claim 1, wherein the first angle is greater than the second angle.

3. The metallic/composite joint of claim 1, wherein the first angle varies along an axial direction.

4. The metallic/composite joint of claim 1, wherein the second angle varies along an axial direction.

5. The metallic/composite joint of claim 1, wherein the first location is located further axially inward from a terminus of the composite member at the flared end than the second location.

6. The metallic/composite joint of claim 1, wherein the cylinder extends from the flared end, and the cylinder and the flared end are monolithic.

\* \* \* \* \*